(12) United States Patent
Osmanski et al.

(10) Patent No.: US 10,693,517 B2
(45) Date of Patent: Jun. 23, 2020

(54) MOBILE DEVICE CONNECTION APPARATUS

(71) Applicant: NITE IZE, INC., Boulder, CO (US)

(72) Inventors: John Osmanski, Mequon, WI (US); Kent Solberg, Whitefish Bay, WI (US); Bowden Ormsbee, Longmont, CO (US)

(73) Assignee: Nite Ize, Inc., Boulder, CO (US)

( * ) Notice: Subject to any disclaimer, the term of this patent is extended or adjusted under 35 U.S.C. 154(b) by 0 days.

(21) Appl. No.: 16/003,962

(22) Filed: Jun. 8, 2018

(65) Prior Publication Data

US 2018/0294830 A1  Oct. 11, 2018

Related U.S. Application Data

(63) Continuation-in-part of application No. PCT/US2017/029019, filed on Apr. 22, 2017.

(60) Provisional application No. 62/326,159, filed on Apr. 22, 2016, provisional application No. 62/414,257, filed on Oct. 28, 2016.

(51) Int. Cl.
| | |
|---|---|
| *H04B 1/00* | (2006.01) |
| *H04B 1/3888* | (2015.01) |
| *A45F 5/02* | (2006.01) |
| *H04M 1/04* | (2006.01) |
| *A45C 11/00* | (2006.01) |
| *A45F 5/00* | (2006.01) |
| *H04M 1/02* | (2006.01) |

(52) U.S. Cl.
CPC ............ *H04B 1/3888* (2013.01); *A45C 11/00* (2013.01); *A45F 5/021* (2013.01); *H04M 1/04* (2013.01); *A45C 2011/002* (2013.01); *A45F 2005/006* (2013.01); *A45F 2200/0516* (2013.01); *H04M 1/0202* (2013.01)

(58) Field of Classification Search
CPC .... H04B 1/3888; H04M 1/04; H04M 1/0202; A45C 11/00; A45C 2011/002; A45F 2005/006; A45F 2200/0516
USPC ........................................................ 224/254
See application file for complete search history.

(56) References Cited

U.S. PATENT DOCUMENTS

| | | |
|---|---|---|
| 2,176,253 A | 10/1939 | Fogarty |
| 5,957,357 A | 9/1999 | Kallman |

(Continued)

FOREIGN PATENT DOCUMENTS

JP     2002051126 A     2/2002

OTHER PUBLICATIONS

International Search Report and Written Opinion dated Jul. 10, 2017 issued in related PCT App. No. PCT/US2017/029019 (7 pages).

(Continued)

*Primary Examiner* — Peter N Helvey
(74) *Attorney, Agent, or Firm* — Haynes and Boone, LLP

(57) ABSTRACT

A mobile device connection apparatus, method and system is disclosed which allows a user to physically connect or tether, without the use of adhesive, a mobile device with a case to a user, surface, or structure. The mobile device connection apparatus comprises multiple layers of materials to create a connection point for mobile devices, such as mobile phones, which is compatible with devices with a case, reusable, and robust and prevents mobile devices from being damaged, lost, and stolen. Further the mobile device connection apparatus allows a user to interact with their phone in new ways.

37 Claims, 20 Drawing Sheets

(56) References Cited

U.S. PATENT DOCUMENTS

| | | | | |
|---|---|---|---|---|
| 7,774,969 B1* | 8/2010 | Silverman | ............ | H05K 5/0278 |
| | | | | 224/257 |
| 8,356,736 B2* | 1/2013 | Musgrave | ................. | A45F 5/02 |
| | | | | 224/197 |
| 8,567,832 B2* | 10/2013 | Kannaka | ................... | A45F 5/00 |
| | | | | 224/218 |
| 2003/0000976 A1* | 1/2003 | Malhotra | ................. | A45F 5/00 |
| | | | | 224/197 |
| 2007/0235493 A1* | 10/2007 | Fortson | ................. | A45C 11/00 |
| | | | | 224/257 |
| 2013/0146635 A1 | 6/2013 | Hedrick | | |
| 2013/0240580 A1* | 9/2013 | Yu | ............................ | A45F 5/00 |
| | | | | 224/217 |
| 2013/0273984 A1* | 10/2013 | Filippov | ................ | H04M 1/12 |
| | | | | 455/575.6 |
| 2013/0292281 A1 | 11/2013 | Chung | | |
| 2013/0300141 A1* | 11/2013 | Byrne | ...................... | A45F 5/00 |
| | | | | 294/25 |
| 2014/0004763 A1 | 1/2014 | Whitley | | |
| 2014/0084034 A1 | 3/2014 | Wangercyn, Jr. et al. | | |
| 2015/0173497 A1* | 6/2015 | Yu | ............................ | A45F 5/00 |
| | | | | 224/218 |
| 2015/0305480 A1* | 10/2015 | Brousseau | ................ | A45F 5/10 |
| | | | | 224/267 |

OTHER PUBLICATIONS

Extended European Search Report dated Dec. 4, 2019 issued in parallel European patent application No. 17786790.0 (23 pages).

* cited by examiner

MOBILE DEVICE CONNECTION APPARATUS

CROSS REFERENCE TO RELATED APPLICATIONS

This application is a continuation in part of PCT/US2017/029019, which claims the benefit of U.S. Provisional application No. 62/326,159, filed on Apr. 22, 2016, and U.S. Provisional application No. 62/414,257, filed on Oct. 28, 2016. These applications are hereby incorporated by reference.

BACKGROUND

1. Field

The disclosure generally relates to connection accessories for mobile devices with cases.

2. Background

Mobile devices, such as mobile phones and smart phones, are one of the most commonly and widely used devices to help an individual with their daily activities; from talking to getting directions to ordering products and beyond. With the increased functionality and technology mobile phones afford an individual, their cost has also increased. It is not uncommon for a mobile phone to cost upwards of $600 USD or greater. Due to the everyday usage mobile devices in daily life situations they tend to experience a lot wear and tear. As a result they are commonly dropped, damaged, lost, and stolen. Further, mobile devices, and significant damage to them, are commonplace in construction settings. These negative realities result in the continual purchase of new phones, the loss of data, and often great inconvenience to individuals, collectively costing individuals billions of dollars (USD) in unnecessary expense.

Currently there are a number of solutions which attempt to reduce the problems associated with dropped, damaged, lost, and stolen mobile devices. Some of these solutions include providing cases to attempt to protect a mobile device from being damaged when dropped. Although cases are helpful, they are not a complete solution. Often these alone cases are problematic as they do not protect a dropped device from all the different degrees and types of damage which may occur from such a drop, prevent theft, prevent loss. Further, robust cases can be heavy and cumbersome additions to the device as well as expensive. Further, cases are specific to one type of phone and are usually not compatible across a variety of models. Another solution has been to purchase insurance on a mobile device, however the deductibles are often hundreds of dollars (USD) alone and an individual still has to cope with the issues of convenience due to lost productivity or family time and lost data such as pictures, e-mail contacts, phone numbers, and notes.

It would be desirable to have a solution which would be compatible with a variety of popular mobile devices with cases; be reusable, robust, removable, and inexpensive which could prevent phones from being dropped, damaged, lost, and stolen. Furthermore, it would be desirable to have an apparatus which would allow a user to connect their mobile device to their persons or property. Therefore, there currently exists a need in the industry such a solution.

SUMMARY

In many embodiments, an attachment device to physically connect mobile devices along with a corresponding case or housing, such as a cellular telephone, mobile phone, smart phone (specifically at least iPhone® versions 4, 4S, 5, 5S, Sc, 6, 6S, 6 Plus, 6S Plus, SE, 7, and 7 Plus) or mobile computing device, to a user, surface, or structure is disclosed. The attachment device is reusable and is compatible with at least any iPhone® brand mobile device and its corresponding case or housing; thus first and foremost reducing the potential for damage to the mobile device if it is dropped by a user and hits the ground. The attachment device also acts to deter mobile device theft by keeping the mobile device physically connected to a user, surface, or structure. In addition, the device also prevents accidental loss of the mobile device due to user forgetfulness. Also, mobile devices are difficult to anchor to a surface or structure without a specialized case, the attachment device allows anchoring to such surfaces or structures using just the connection device and the existing mobile device and associated case, allowing a user to interact with the mobile devices in new ways. For example it may be desirable to hang the mobile device on a hook to keep it off the ground in a wet or dirty environment or connected to a user if they are working high above the ground. Further, the attachment device could be used as a "leash" or "handle" for the mobile device to allow the user to easily, quickly, and safely remove the mobile device from a pants pocket, purse, bag, or other carrying method without the user having to actually grab the mobile device itself, as mobile devices can be large and the carrying method may have a small opening or be cluttered with other items, making removal of the device difficult and cumbersome. Further, a neck lanyard could be used to hang the attachment device around an individual's neck if they are wearing light clothing or clothing without pockets. Also, a retractable reel could be used with the attachment device and connected to an individual's pant belt loop, harness, or other similar product, and used to protect a dropped device from hitting the ground while still providing easy access to talking or looking at the device while it stays connected.

Users take mobile devices everywhere and rely heavily on them for work, communication, socializing, and entertainment. These types of devices which are often relatively small and easy to drop, can be very expensive as well as time consuming to setup. As such the attachment device disclosed can help save a user time, money, stress, and frustration. The attachment device provides all of these mentioned benefits in a novel way as it is reusable and allows mobile devices to be physically attached to a user, surface, or structure without the need for a separate specially designed case or housing enclosure for the device.

A technical advantage of the attachment device disclosed is it is compatible with at least iPhone® smart phone versions 4, 4S, 5, 5S, 5c, 6, 6S, 6 Plus, 6S Plus, SE, 7, and 7 Plus and a corresponding case as long as the device has an opening in the case to accommodate a connection such as a charging cable. Corresponding cases can be of any material common to mobile device case compositions, such as plastic, rubber, silicon, or metal.

Another technical advantage of the attachment device does not use adhesive, such as a sticker, tape, or glue, to attach the attachment device to the mobile device or the case.

Another technical advantage of the attachment device is it is reusable.

Another technical advantage is it provides a robust physical connection point to securely connect a mobile device and case to a user, surface, or structure.

Another technical advantage of the attachment device is it allows a user to easily pull a mobile device with a case from their pocket, purse, and bag.

Another technical advantage of the attachment device is it does not permanently connect or attach to the mobile device or the case. As a result the attachment device is reusable and can be quickly and easily added or removed from the mobile device and case as desired by the user and transferred to another mobile device and case or housing without marking or leaving adhesive deposit on the mobile device or the case.

In one embodiment, a mobile device connection apparatus includes a plate-like piece of material, the plate-like piece of apparatus having electrostatic cling properties, the plate-like piece of material folded onto itself. The device further includes a connector, the connector sandwiched between the plate-like piece of material. The plate-like piece of material is shaped to fit on a back of an electronic device, such that the plate-like piece of material is sandwiched between the back of the electronic device and a case, the plate-like piece shaped and having the electrostatic cling properties, to resist lateral movement in relation to the electronic device while being held to the back of the electronic device from moving in an orthogonal direction in relation to the electronic device. Alternatively, the plate-like piece of material is composed of polyvinyl chloride. In one alternative, the connector is a thin ribbon of material. In another alternative, the connector is nylon. In another alternative, the apparatus further includes a ring attached to the connector. Alternatively, the plate-like piece of material has a rectangular shape with rounded corners. Optionally, the connector extends from an edge of the plate-like piece of material and a portion of the edge is cut back towards a center of the plate-like piece of material where the connector extends from the edge. In another alternative, the apparatus further includes an adhesive holding the plate-like piece of material in a folded position. In one configuration, the adhesive is an adhesive sheet. In another alternative, the apparatus further includes a carabiner attached to the ring. Alternatively, the carabiner is a double gated carabiner. In another alternative, the apparatus further includes a lanyard attached to the carabiner. In another alternative, the apparatus further includes a carabiner attached to the lanyard. Optionally, the connector is positioned in the plate-like piece of material, such that the connector extends out of the case near a charging port of the electronic device.

In another embodiment, a mobile device connection apparatus for holding a mobile device includes a flat body piece. The apparatus further includes a connector attached to the flat body piece. The apparatus further includes a case, the case sandwiching the flat body piece between the case and a back of the mobile device. In one alternative, the flat body piece strongly resists lateral movement in relation to a plane of the back of mobile device when on the back of the mobile device. In another alternative, the flat body piece resists orthogonal movement in relation to the plane of the back of the mobile device less than the lateral movement. Alternatively, the case prevents the orthogonal movement. Optionally, the flat body piece is composed of a material that strongly resists lateral movement in relation to a plane of the back of mobile device when on the back of the mobile device. In another alternative, the flat body piece is composed of the material that resists orthogonal movement in relation to the plane of the back of the mobile device less than the lateral movement. Alternatively, the case prevents the orthogonal movement. Optionally, the material has electrostatic cling properties. In another alternative, the material is polyvinyl chloride. Alternatively, the connector extends from an edge of the flat body piece, in line with a largest plane of the flat body piece. Optionally, the edge is cut back where the connector extends from the edge. In one alternative, the connector is a thin ribbon of material. In another alternative, the connector is nylon. In another alternative, the apparatus further includes a ring attached to the connector. In another alternative, the apparatus further includes a carabiner attached to the ring. Alternatively, the carabiner is a double gated carabiner. In another alternative, the apparatus further includes a lanyard attached to the carabiner. In another alternative, the apparatus further includes a carabiner attached to the lanyard. Alternatively, the flat body piece has a rectangular shape with rounded corners. Optionally, the connector is positioned in the flat body piece, such that the connector extends out of the case near a charging port of the electronic device. Alternatively, the connector extends out of an aperture of the case positioned for the charging port. Optionally, the flat body piece is folded on itself to sandwich the connector, such that only a portion of the connector extends out. In another alternative, the apparatus further includes an adhesive sheet positioned in a fold of the flat body piece to hold the flat body piece in a folded position.

In one embodiment, a method of securing a mobile device includes providing a mobile device connection apparatus for holding a mobile device including: a flat body piece; a connector attached to the flat body piece; and a case, the case sandwiching the flat body piece between the case and a back of the mobile device. The method further includes placing the flat body piece on the back of the mobile device. The method further includes placing the case over the flat body piece and the mobile device and connecting the connector to a secure tether point. Optionally, the method further includes the connector through a hole in the case for the charging port.

In another embodiment, a removable mobile device connection apparatus includes a folded first material configured into a geometric shape comprising a first layer and a second layer. The first layer includes a top surface, a bottom surface, and a bottom edge, and the second layer is located below the first layer and comprises a top surface, a bottom surface, and a bottom edge. The apparatus further includes a strengthening material located between the first layer and the second layer and configured to create connection point extending from the center of the bottom edges of the first and second layer. The apparatus further includes and a second material configured into a geometric shape comprising a third layer and located beneath the second layer. The bottom surface of the first layer is adhered by a first adhesive to the strengthening material and also to the top surface of the second layer, and the bottom surface of the second layer is adhered by a second adhesive to the top surface of the third layer. In one alternative, apparatus is less than or equal to 1.016 mm thick. Alternatively, the connection point is a loop. Optionally, the loop is between 10 mm and 12 mm long. In another alternative, the first material is comprised of thermoplastic polymer resin. Optionally, the first material is comprised of high-density polyethylene fiber material. Alternatively, the second material is comprised of polyvinyl chloride. Optionally, the strengthening material comprises nylon, Kevlar, or carbon fiber filament. In another alternative, the strengthening material further comprises urethane coated nylon 420 denier. Optionally, the first adhesive and the second adhesive is a permanent acrylic adhesive tape with at least 1116 g/cm adhesive value. Alternatively, the first, second, and third layers are all quadrilateral shaped with rounded corners. In another embodiment, mobile device connection system for use with a mobile device includes a mobile device case; a removable non-adhesive mobile device connection apparatus located inside the case; and a user connection unit removably attached to the mobile device connection apparatus. Optionally, the user connection unit is a ring. Alternatively, the mobile device case is comprised of plastic, rubber, silicon, or metal.

In one embodiment, a method to physically secure a removable mobile device with a case to a user, surface, or structure includes placing a removable mobile device connection apparatus with a connection point on the inside surface of mobile device case. The method further includes centering the apparatus near an opening of the case so the connection point extends through the case opening. The method further includes placing the mobile device into the case so the removable mobile device connection apparatus is configured securely without adhesive between the inside of the case and the back surface of the mobile device, with the connection point extending away from the mobile device and case, extending through an opening in the case. The method further includes attaching a securing material to the connection point.

The attachment device now will be described more fully hereinafter with reference to the accompanying drawings, which are intended to be read in conjunction with both this summary, the detailed description and any preferred and/or particular embodiments specifically discussed or otherwise disclosed. This attachment device may, however, be embodied in many different forms and should not be construed as limited to the embodiments set forth herein; rather, these embodiments are provided by way of illustration only and so that this disclosure will be thorough, complete and will fully convey the full scope of the attachment device to those skilled in the art.

DETAILED DESCRIPTION

Figure 1:
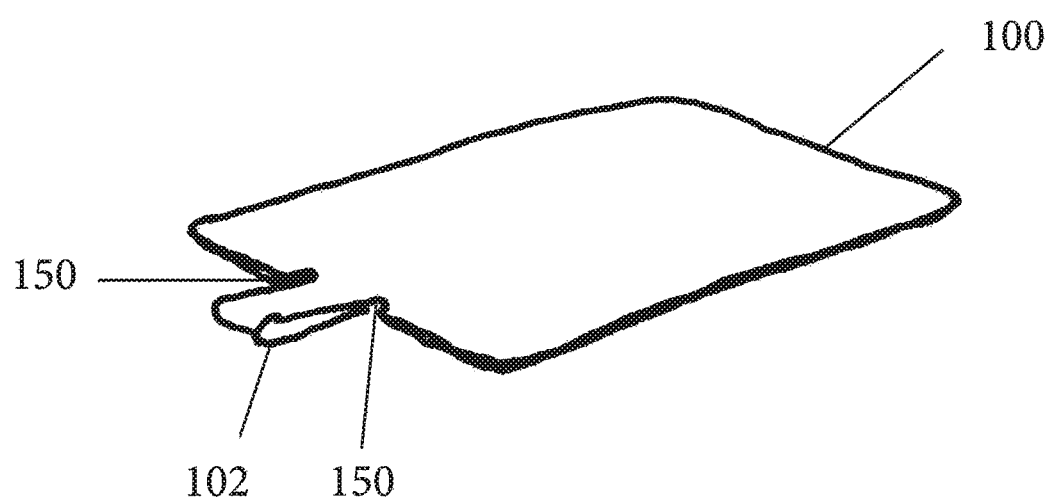
FIG. 1 is a perspective view of an embodiment of an attachment device.

A mobile device connection apparatus (also referred to as an attachment device), method, and system will now be described with references in FIGS. 1-12. Turning to the drawings, where the reference characters indicate corresponding elements throughout the several figures, attention is first directed to FIG. 1, which shows an embodiment of the mobile device connection apparatus, generally indicated by reference character 100. The apparatus 100 is a quadrilateral shape, such as a square or rectangular, with rounded corners and a connection point or loop 102 protruding from the center of the bottom edge of the apparatus. There may be a divot 150 on each side of loop 102 to provide additional strain relief from loads applied to loop 102 by maximizing round corners instead of sharp corners around the perimeter of apparatus 100. The size of the divot is at least 1.27 mm in length and 1.27 mm in width as measured from the bottom edge of apparatus 100. The divot although not required, provides additional strain relief in this embodiment. The apparatus is comprised of at least two materials configured in multiple layers. The apparatus is thin enough to allow it to be placed between the back of a mobile device and a device case or housing and allow the device to fit appropriately in the case to allow the case to operate as it was originally designed. Apparatus 100 is at most 1.016 mm thick but could be thinner if desired or in a rare situation, thicker if the specific device and case afford the extra apparatus thickness. It is contemplated the apparatus may be a variety of shapes and sizes as will be discussed shortly.

Figure 2:
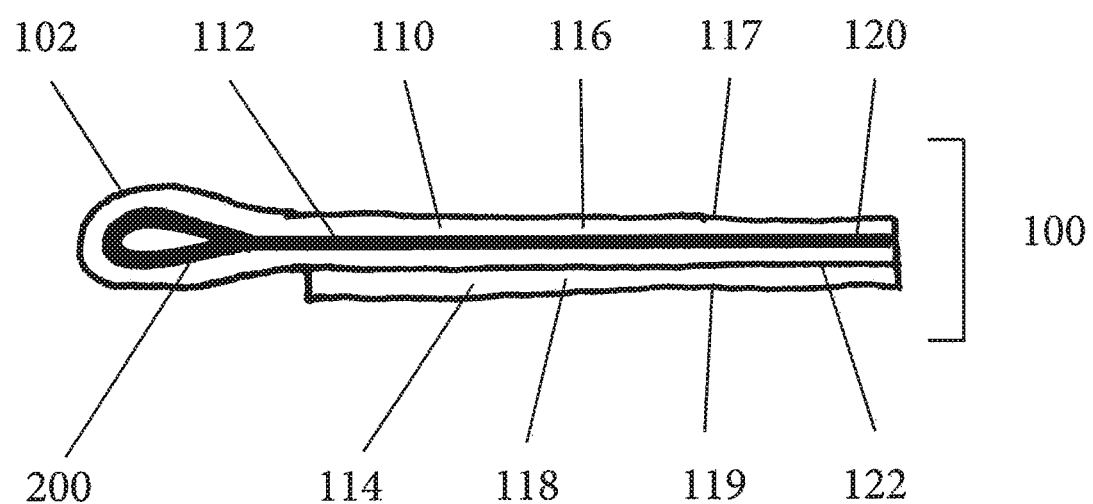
FIG. 2 is a side view of the attachment device of FIG. 1.

Turning to FIG. 2, a side view of an embodiment of apparatus 100 is shown illustrating its composition. Apparatus 100 comprises a first layer 110, a second layer 112, and a third layer 114. The first layer 110 and second layer 112 is made of a first material 116, which is a single piece of material folded over on top of itself to form the first layer 110, the second layer 112, and the loop 102. First layer 110 has a top surface 117 and third layer 114 has a bottom surface 119. Enclosed between first layer 110 and second layer 112 is a length of strengthening material 200 which when folded creates a ring or opening that comprises loop 102, adding strength to the loop, and to the overall structure of apparatus 100. Connection point or loop 102 may also be configured so there is no opening, as a single piece of material with an opening formed there through. Strengthening material 200 comprises a synthetic material or fiber such as nylon, Spandex, a fiber or filament with high tensile strength Kevlar® from DuPont™, or other material such as carbon fiber filament. A preferred nylon material is urethane coated nylon 420 denier. In the case of Kevlar® or carbon fiber filament is contemplated any desired amount of fiber count can be used, such as 3,000, 12,000, or 24,000 filament count. High tensile strength means the material has a higher tensile strength than other materials known in the art used for similar purposes or that is known in the art to have a high tensile strength. The preferred thickness of the strengthening material 200 is 0.254 mm but a different thickness could be used as long as the entire apparatus 100 meets the 1.016 mm or less thickness specification defined above.

The first material 116 of the first layer 110 and the second layer 112 is a material that is flexible, resistant to tearing, resistant to shearing, water resistant, and thin. Synthetic materials are ideal for this use, one such material that is ideal comprises high-density polyethylene fiber material, such as the material Tyvek® or Kevlar® from DuPont™. Another ideal material comprises thermoplastic polymer resins like PETG (Polyethylene terephthalate). The first material 116 thickness should not be more than 0.305 mm, with an ideal material thickness of 0.127 mm. Next, a second material 118 comprises the third layer 114. The third layer 114 and the first layer 110 sandwich, or are located on either side of, the second layer 112. The second material 118 is different than first material 116. Ideally the second material 118 comprises a synthetic plastic polymer such as polyvinyl chloride, which provides a property of temporary adhesion or "cling" (suction) between the second material 118 and the back surface of the mobile device. The cling or suction property provides the second material 118 to ability to removably adhere to an often smooth device back surface without the requirement for adhesion to the mobile device with an adhesive, such as tape or glue, thereby avoiding issues such as leftover adhesive material residue on the device, or marring of the device if apparatus 100 is removed from the device. A common name for this type of material is "window cling material" or "cling vinyl." The second material 118 will have a thickness of not more than 0.305 mm. Further, although the surface of the second material 118 could continue to extend beyond the square or rectangular shape of apparatus 100 to cover the outside surface of loop 102, the second material 118 will ideally end where loop 102 begins on the back edge of the apparatus 100. First material 116 may be any color or opacity, but ideally it is opaque and colored white or black. Second material 118 can also be any color or opacity but is ideally clear or translucent.

First layer 110, second layer 112, and third layer 114 are adhered together by the process of lamination, by an adhesive material, or a combination of both methodologies. In the case of an adhesive, the adhesive may be any permanent or semi-permanent adhesive applied in a layer, such as in a tape format that is at least 0.0254 mm thick. An ideal adhesive would be a double sided permanent acrylic adhesive tape or roll with at least a 0.0761 mm thickness and at least 1116 g/cm (100 oz/in) adhesive value to insure adequate adhesion between the layers and provide a durable and robust apparatus. Further it is most efficient for manufacturing if the same adhesive is used to adhere all layers together, however use of different adhesives is contemplated. The first layer 110 and second layer 112 could be adhered together at their adjoining surfaces 120. The second layer 112 and third layer 114 could be adhered together at their adjoining surfaces 122. Strengthening material 200 is enclosed between first layer 110 and second layer 112 by the process of lamination, adhesive material, or a combination as mentioned above. If adhesive material is used, strengthening material 200 is adhered using the adhesive material to adhere first layer 110 and second layer 112 together by their adjoining surfaces 120.

The first material 116 and strengthening material 200 provides the strength to support the weight and force of a load connected to loop 102 as well as some adhesion properties (friction) while second material 118 provides removable adhesion properties to adhere apparatus 100 to the back surface of the mobile device without the need for adhesive, as will be described shortly. Loop 102 provides a means to connect or tether a physical connection to the mobile device and case. Loop 102 provides the strength to resist failure from at least the weight of a 0.907 kg weight hanging directly from loop 102 for at least five minutes. This lower limit accommodates at least a multiple of the minimum force load likely to be applied to the apparatus, the dead weight of an !Phone® which, version (4, 4S, 5, SS, Sc, 6, 6S, 6 Plus, 6S Plus, SE, 7, or 7 Plus) weighs (without the case) about to 138 grams or less without any directional force applied. The apparatus is designed to be strong and robust, but not so strong as to disallow breakage by a user in an emergency. One example is a situation where a tethered mobile device (tethered by the apparatus) is caught in moving machinery, such as a car, that a user could not forcibly break the apparatus through effort to avoid being pulled into or along with the machinery.

Figure 3:
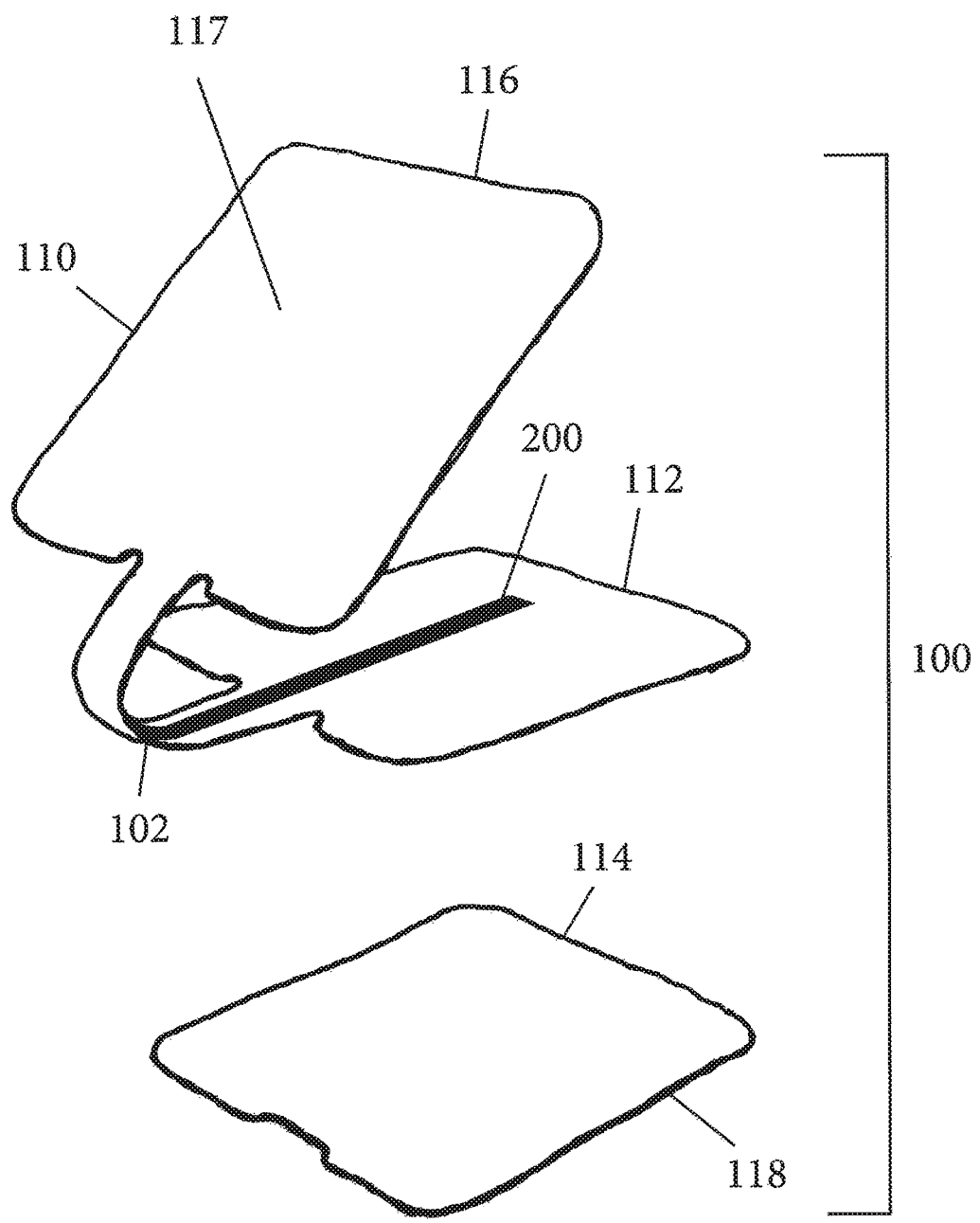
FIG. 3 is an exploded isometric view of the attachment device of FIG. 1.

Referring now to FIG. 3, an exploded view of an embodiment of apparatus 100 is disclosed to further illustrate how first layer 110, second layer 112, and third layer 114 are arranged. Further, strengthening material 200 is extends the length of first material 116 and in this embodiment is at most as wide as loop 102. Strengthening material 200 could be a length shorter than the length of first material 116 if desired, but does need to extend through the portion of first material 116 which comprises loop 102 in order to add strength to loop 102.

Figure 3A:
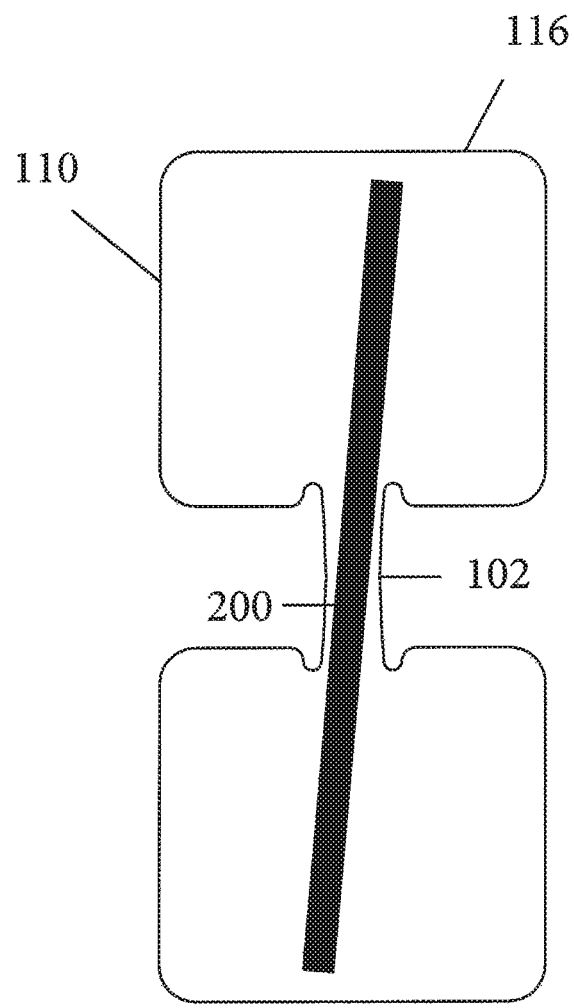
FIG. 3A is a top plan view of the attachment device of FIG. 1.

Referring now to FIG. 3A, a top plan view of first material 116 is disclosed to further illustrate how strengthening material 200 is positioned. Ideally strengthening material 200 is positioned at a slight angle in order in a "V" shape to allow strengthening material 200 to fully embrace the surface of first material 116 and any adhesive material used to attach first layer 110 and second layer 112 together. Further, the slight angle placement of material 200 allows a thinner profile of the complete apparatus 100, which ensure a compatible fit with the desired device and case. It is contemplated the strengthening material 200 could be positioned parallel (along the first material's length) with first material 116 if desired for ease of manufacturing. The width of strengthening materials is at most the width of loop 102 or less to fit inside loop 102. The length of strengthening material is will depend upon the length and width of apparatus 100, but be at least substantially the length of apparatus 100 to ensure adequate adhesion of the surface area of both sides of strengthening material 200 to first layer 110 and second layer 112.

Figure 4:
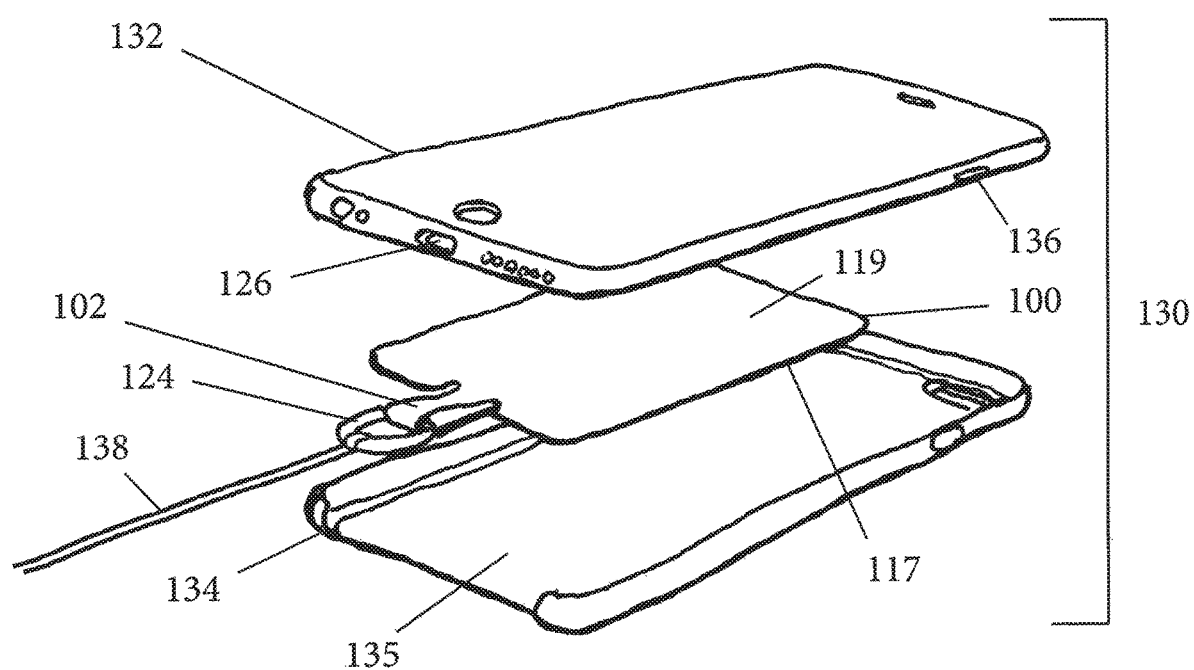
FIG. 4 is an exploded isometric view of the attachment device of FIG. 1 used with a smart phone and a case.

Referring now to FIG. 4, an exploded isometric view of an embodiment of the apparatus 100 as a system 130 is disclosed. The system 130 includes a mobile device case or housing 134, the mobile device connection apparatus 100, and a user connection means 124. System 130 is mean to be used with a mobile device 132. The apparatus 100 is placed in-between the device 132 and the case 134. In particular, when connecting device 132 and case 134, apparatus 100 is placed in-between the back surface 136 of mobile device 132 and the interior surface 135 of case 132. Further, top surface 117 of first layer 110 faces the interior surface 135 of the case 134, and when top surface 117 and interior surface 135 of the case are pressed together the resulting friction between top surface 117 and interior surface 135 of the case and the friction and "cling" or suction between the back surface 136 of mobile device 132 and the bottom surface 119 helps to keep the apparatus 100 from moving (and ultimately failing) if a load is placed on loop 102. If desired (but not required), a drop of water rubbed on bottom surface 119 before applying to the interior surface 135 of the case will increase the "cling" or suction between the surfaces. The back surface 136 of device 132 is ideally comprised of glass or other smooth material such as metal or plastic and second material 118 helps provide extra friction and "cling" or suction to enable the apparatus 100 to removably adhere to the device 132 without the need for an adhesive such as glue, tape, or other residue leaving adhesive. Apparatus 100 is thin enough so as to not interfere with the operation and connection of the device 132 to fit securely into case or housing 134. If desired apparatus 100 can easily be removed from the mobile device 132 by first removing the case 134 and then peeling the apparatus 100 up and away from the back surface 136 of the device 132. Likewise apparatus 100 can be re-applied to mobile device 132 and case 134 reconnected to the device 132 and apparatus 100 will operate the same as if it was not removed in the first place. The structural strength of apparatus 100 as well as its ability to adhere securely to the mobile device 132 and case 134 act to keep apparatus 100 from slipping away from device 132 and case 134, or loop 102 from failing when a load of 0.907 kg is connected loop 102 for at least five minutes. As such a 0.907 kg load requirement is used to ensure that apparatus 100 will adequately support such devices as well as significant increases in mobile device weight if it should occur or a reasonable directional force applied to connection point 102, such as a "tug" by a user. It is contemplated surface area of apparatus 100, and the quantity of layers, may be increased to increase the load bearing capacity for heavier devices. Some of the most currently popular smartphones that vary in weigh are the iPhone® 6s, iPhone® Plus, Samsung Galaxy® S6 edge+, and the Samsung Galaxy® Note 5.

Further, loop 102 of the apparatus 100 has an ideal width of 10 mm or smaller in order to accommodate the small opening of a mobile device case used to accommodate a cable connected to a cable connection port 126 for recharging or communicating with the device. However the width of loop 102 can be varied to accommodate various connection port 126 widths and likewise a corresponding case opening, thus loop 102 width being smaller or larger than 10 mm. The length of loop 102 can be as short or long as needed to accommodate a user connection means 124 to connect the apparatus 100 to the desired user or surface. An ideal length of loop 102 is between 5 mm and 12 mm to accommodate varying mobile device and case sizes and configurations. Further, the loop length of 10 mm and 12 mm is ideal as it is long enough to be compatible with heavier duty case with thick case walls, such as Otterbox® brand cases, or with waterproof cases, but to also be short enough to avoid inconvenience for the user or extraneous wear on loop 102. It is contemplated loop 102 could be longer, such as to create a way for the user to directly grab or hold their mobile device and case, making it easier to pull the device and case from a pocket, purse, bag, or other similar item.

The loop is also flexible and thin enough to allow a cable to be plugged into cable connection port 126 while apparatus 100 is attached to the device 132 and case 134 as to not interfere with the cable connection. Further, it is contemplated the loop is configured to accommodate various connection means, such as rings, hooks, carabiners, snaps, and lengths of string, cord, wire, or similar.

The square or rectangular shape with rounded corners of apparatus 100 is ideally the width of the mobile device 132 and a length of ½ the length of the device 132 and located near the bottom of the device as to allow loop 102 to align with the cable connection port 126 of the device 132. For example, an iPhone® 5s device is 6.35 cm wide by 12.4 cm long. Apparatus 100 for this device would be 6.35 cm wide by 6.2 cm long. However the length of the apparatus 100 can have a width as small as $\frac{1}{2}^{th}$ the width of the mobile device and a length of $\frac{1}{4}^{th}$ the length of the mobile device and can still hold a 0.907 kg load connected to loop 102 for at least five minutes without failing. The size of apparatus 100 could also be larger, possibly as long and wide as the entire mobile device if desired.

User connection unit 124 is ideally a ring made of a rigid material, such as metal or plastic, connected to loop 102 and accommodates a further connection to the user, surface anchoring, or structure anchoring. The ring could be any desired size, composition, and type that fits around the width of loop 102 and strong enough to support 0.907 kg hanging weight for at least 5 minutes without failing but it is ideal the outer ring diameter is equal to or smaller than the width of the mobile device port 126 to make installation of the apparatus 100 easier for cases with openings just larger enough for a charge cable or charge port plugs (for waterproof cases). Further, a preferred ring would be a split-ring or closed loop metal jump ring that is 10 mm in outer diameter, 8 mm inner diameter, and is 18 gauge. Further, it is contemplated that user connection units 124 need not be a ring but may directly be any connection type or anchoring type to physically connect an object to a user, such as a retractable tether, string, chain, lanyard, bracelet, leash, or similar, and tied, clipped, hooked, or otherwise fastened to the user by their clothing such as a belt loop, purse, bag, wrist, neck, or other connection point as desired by the user. User connection unit 124 could also connect the device 132 to a surface or structure such as by a suction cup, hook, peg, opening, hole, or other appropriate connection method based on the desired connection surface or structure. An example of a structure could be a tent, building, dwelling, automobile, boat, or other structure a user may want to connect a mobile device to. Further, the user connection unit 124 could be fashioned with a quick release mechanism to allow a quick and easy way to release and re-attach the user connection unit 124 to the user, such as with plastic or metal clips or magnets. In addition the user connection unit 124 could be combined to include multiple user connection units connected in series, such as is shown in FIG. 4, where loop 102 is connected to user connection unit (here a ring) 124 which is further connected to another user connect unit 138, in this case a string or leash, which is then further connected to a user.

Figure 5:
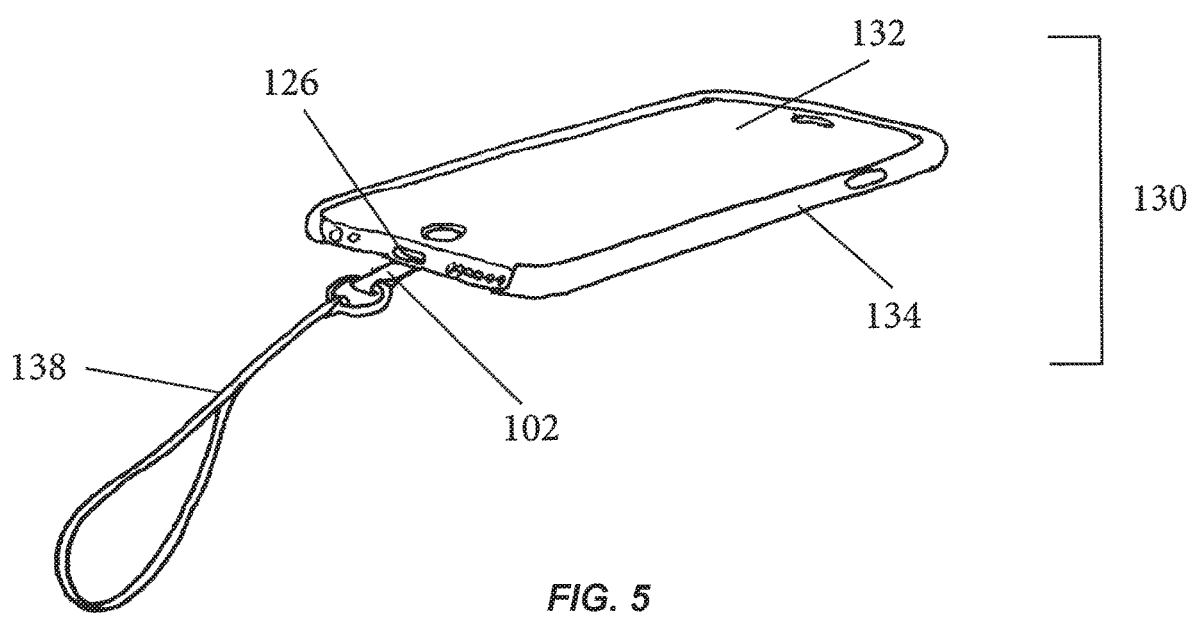
FIG. 5 is a perspective view of the attachment device of FIG. 1 in use.
Figure 6:
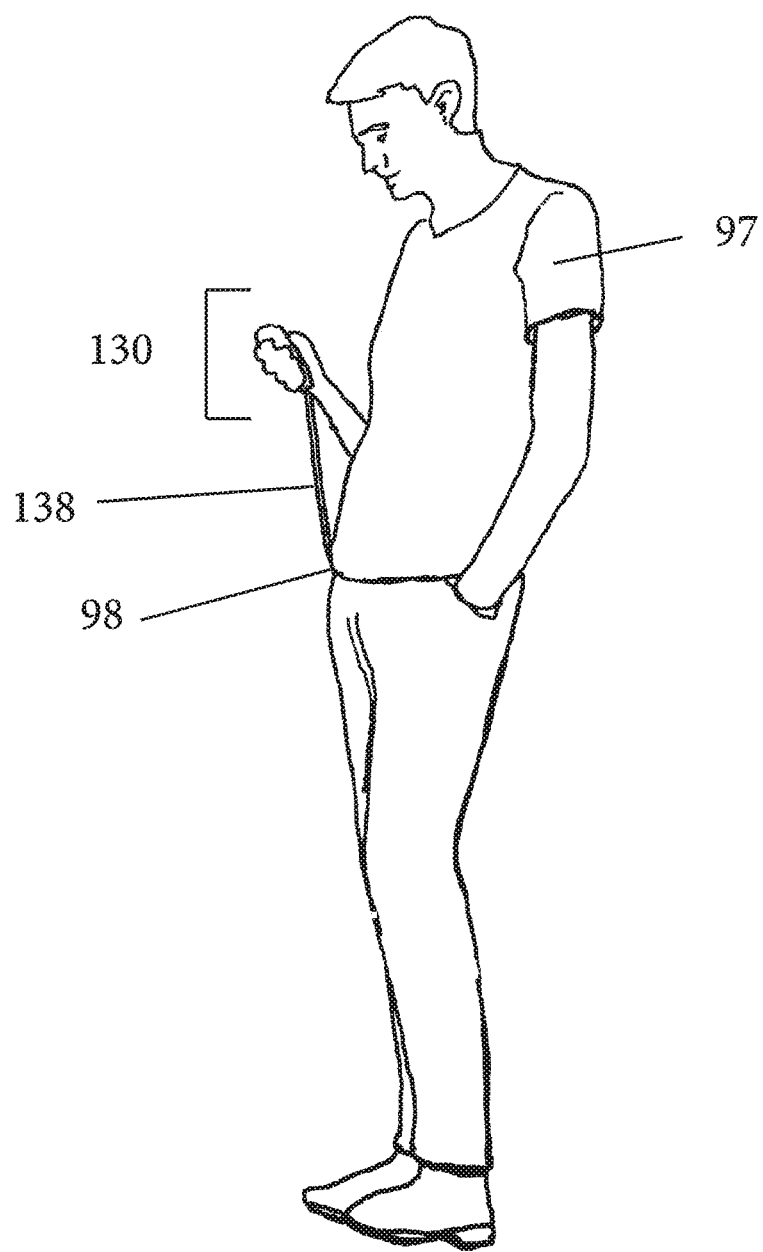
FIG. 6 is a perspective view of a user using the attachment device of FIG. 1 with a mobile device.

Referring now to FIG. 5 is an embodiment of a completed mobile device connection system 130 and a strap 138 which connects to a user's wrist. FIG. 6 is an embodiment of system with a longer version of strap 138 coupled to the pants belt loop 96 of a user 97 by any common method such as clip, hook, carabiner, or ring.

Figure 7:
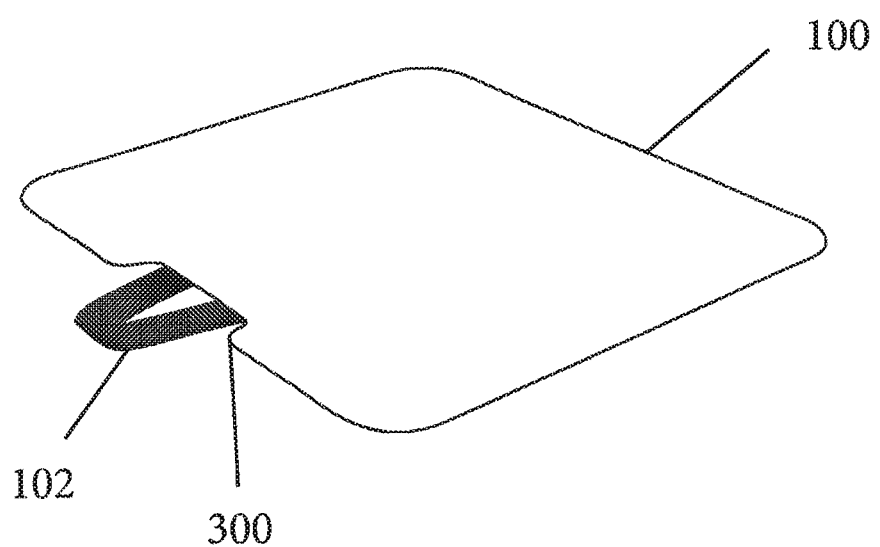
FIG. 7 is a perspective view of another embodiment of an attachment device.
Figure 8:
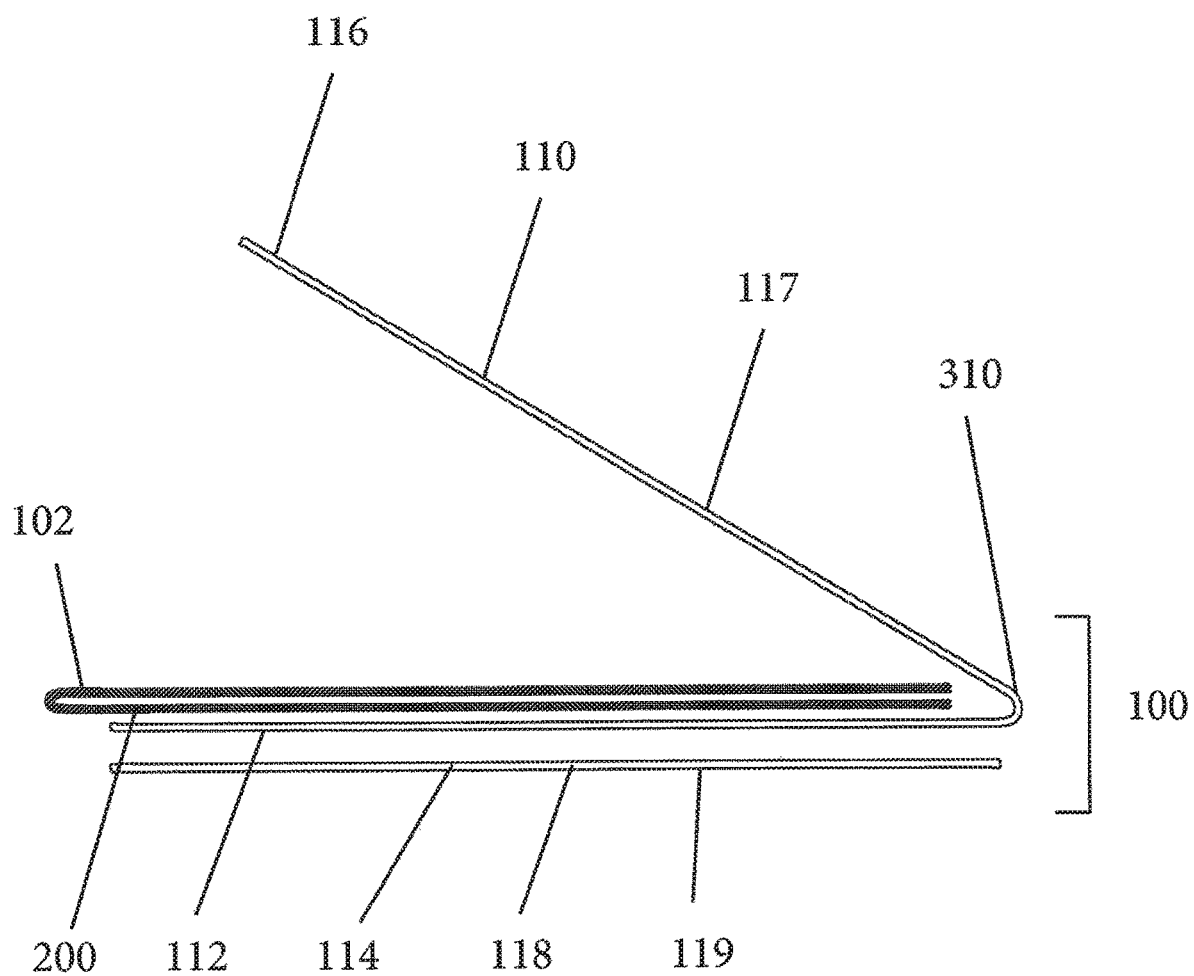
FIG. 8 is a side view of the attachment device of FIG. 7.
Figure 9:
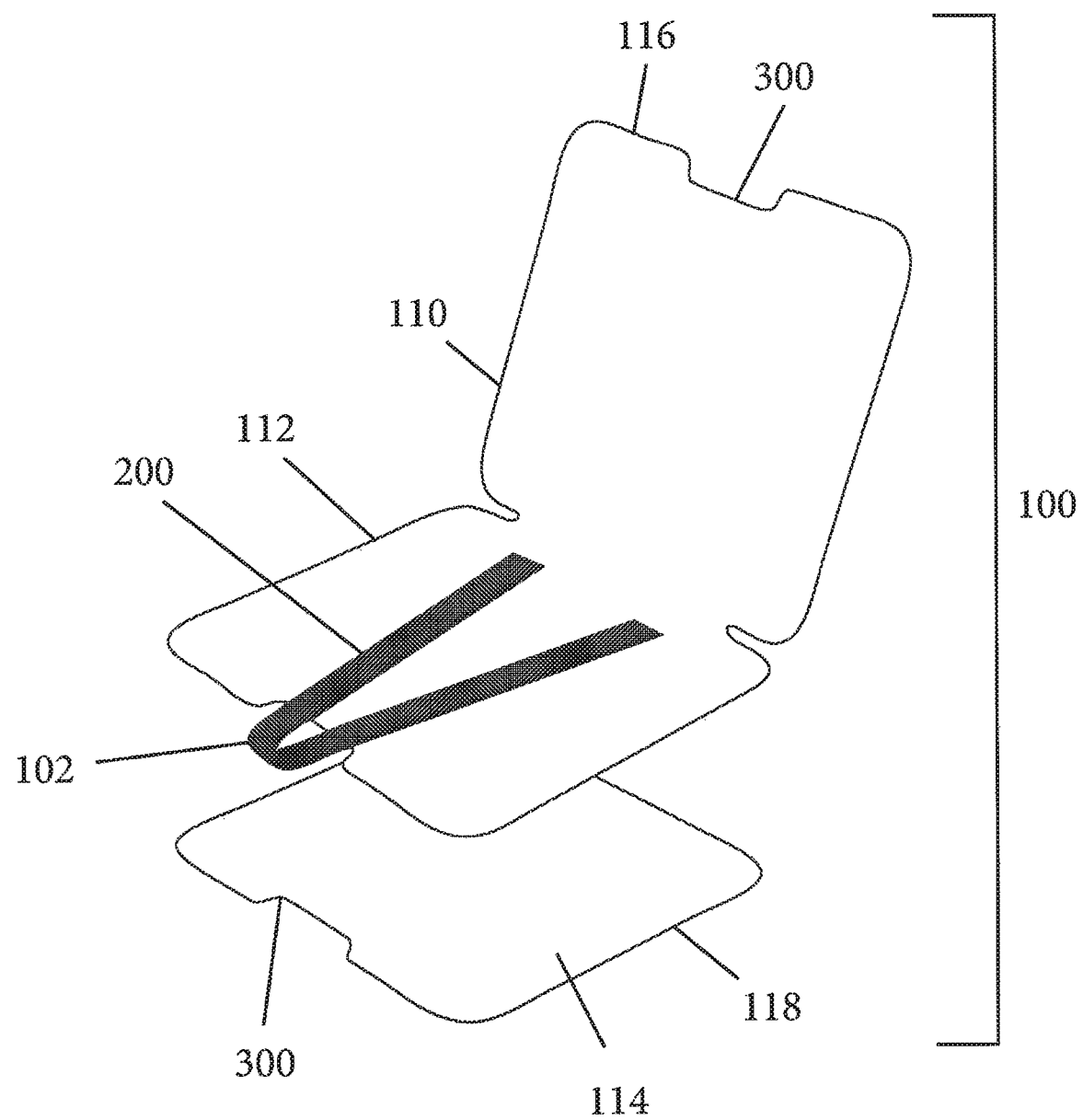
FIG. 9 is an exploded isometric view of the attachment device of FIG. 7.

Referring now to FIGS. 7, 8, and 9, a preferred embodiment of apparatus 100 is disclosed. FIG. 7 shows view of an embodiment while FIG. 8 discloses a side view of the embodiment with the same elements and descriptions thereof from FIG. 2 except for the differences noted below. As shown in FIG. 8, first material 116 is folded on itself comprising first layer 110 and second layer 112 as described above, but first material 116 is folded at point 310, providing loop 102 to be comprised entirely of strengthening material 200. This embodiment makes manufacturing at scale easier and more efficient.

Referring to FIG. 9, an exploded view of an embodiment of apparatus 100 is disclosed illustrating the preferred embodiment further. First layer 110 and second layer 112 may have relief element 300 which allows loop 102 more free range of movement and helps to make consistent and efficient centering and configuring of the strengthening material 200 into loop 102 during manufacturing. Strengthening material 200 is ideally 10.16 cm long and configured to make loop 102 a length of 10-12 mm for the reasons previously discussed.

Figure 10:
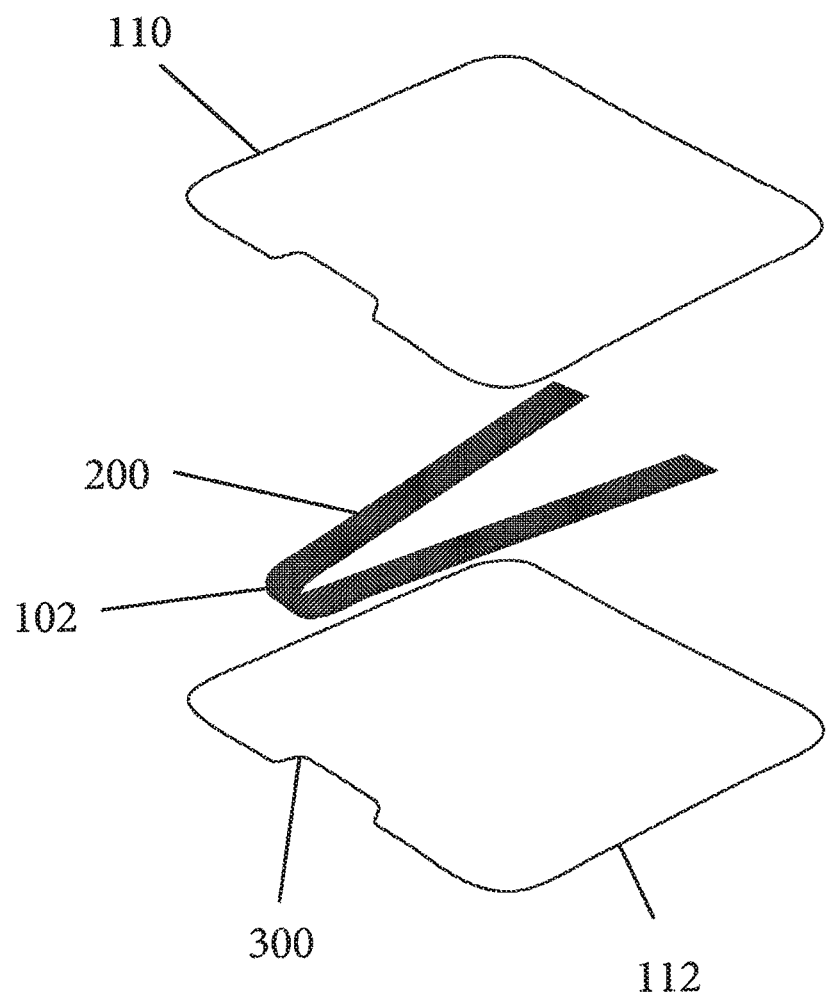
FIG. 10 is an exploded isometric view of the attachment device of FIG. 7.
Figure 11:
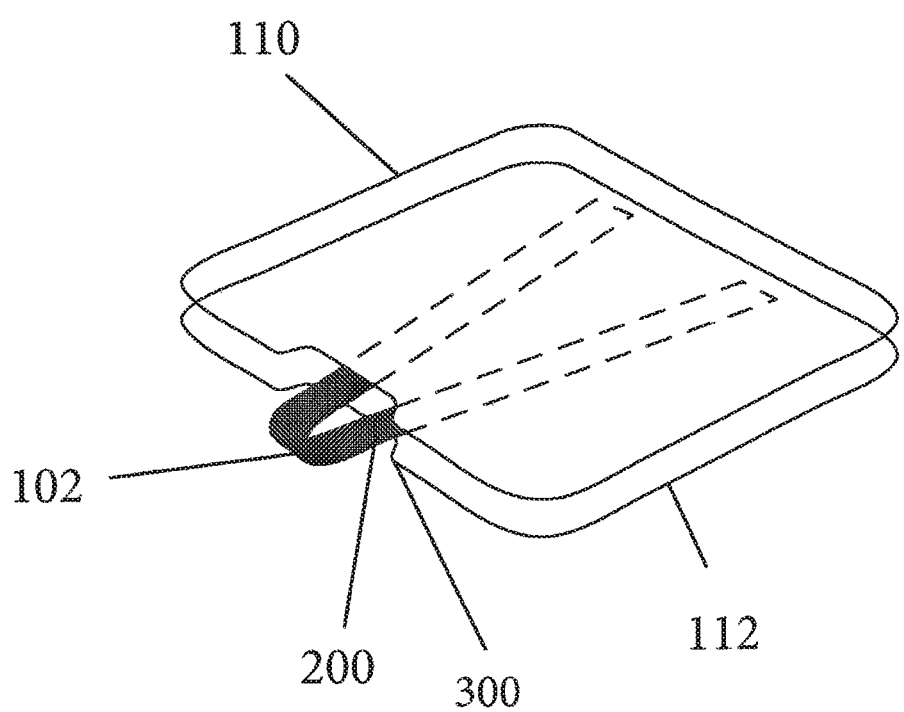
FIG. 11 is a partially exploded view of the attachment device of FIG. 7.

Referring now to FIG. 10 and FIG. 11 an embodiment of apparatus 100 is disclosed. The is the same square or rectangular shape already described but is comprised entirely of a first layer 110 and second layer 112 which are separate, and made of any material desirable such as synthetic material, high-density polyethylene fiber material, PETG, or cling vinyl material as described above. First layer 110 may be the same or a different material than layer 112. The loop 102 is made entirely of strengthening material 200. The strengthening material 200 is adhered to first layer 110 and second layer 112 by the adhesive described above which also is used to connect the layers. Further, it is contemplated the shape of apparatus could include least one hole or opening formed there through. The holes or openings formed there through could be any shape and size as long as the minimum load requirement of 0.907 kg held by loop 102 is maintained. Holes or cutouts formed there through the apparatus are desirable for devices which have integrated components which would otherwise be covered up by the traditional square or rectangular shape of the apparatus located on the back surface of the device. For example some devices have a speaker, microphone, or camera located on the surface of the device. Other shapes are also contemplated such as a letters, geometric shapes, symbol, or a company logo. Further embodiments could include changes the apparatus shape from a rectangle to a circle shape. It is contemplated that the apparatus could have one or both outer facing surfaces (top surface 117 and bottom surface 119) printed upon, such as by screen printing, with company or artistic information for identification and display. Further, electronic tracking methods such as a RFID tag or other similar ways could be added on top, below, or contained between layers of the apparatus 100 structure to accommodate the user's desired needs as long as the minimum load requirements mentioned above are maintained.

Figure 12:
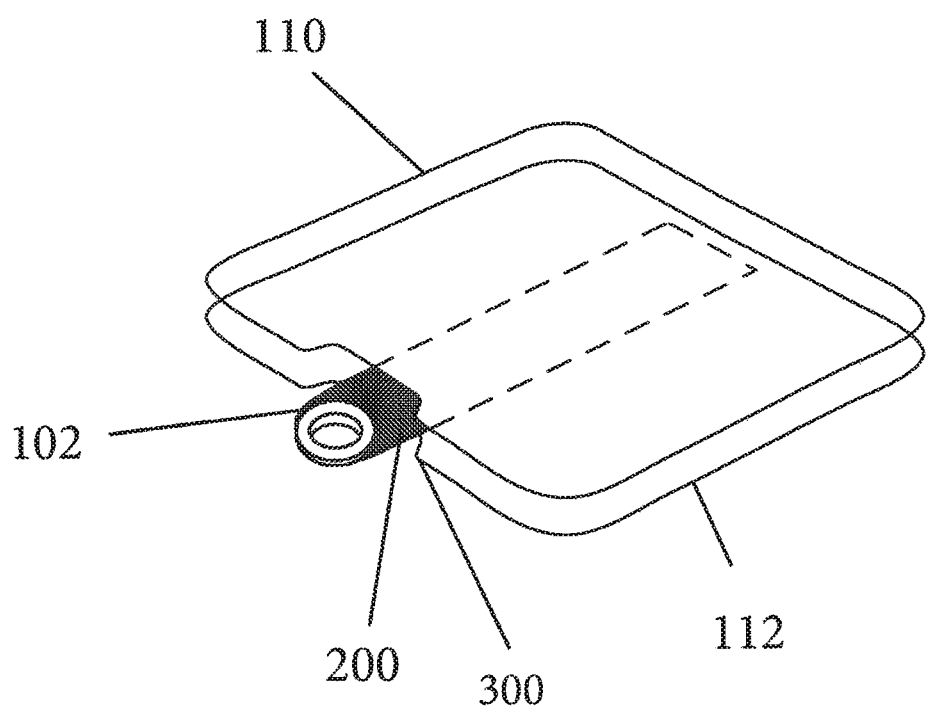
FIG. 12 is a perspective view of another embodiment of an attachment device.

Referring to FIG. 12 an embodiment of apparatus 100 is disclosed that is similar to the embodiment described above and disclosed in FIG. 10 and FIG. 11, however strengthening material 200 is a single piece of material and connection point 102 has an opening formed there through and reinforced with a rivet. Further, the portion of strengthening material 200 located in between first layer 110 and second layer 112 may also be configured to mimic the shape of first and second layer 110. In this case first layer 110 is adhered to one side strengthening material 200 by an adhesive and second layer 112 is adhered to the other side of strengthening material 200 by an adhesive.

A method is disclosed to physically secure a mobile device with a case to a user, surface, or structure. The method includes the steps of placing a removable mobile device connection apparatus with a connection point on the inside surf ace of mobile device case, centering the apparatus near an opening of the case so the connection point extends through the case opening; placing the mobile device into the case so the removable mobile device connection apparatus is configured securely without adhesive between the inside of the case and the back surface of the mobile device, with the connection point extending away from the mobile device and case, extending through an opening in the case; and attaching a securing material to the connection point.

Figure 13A:
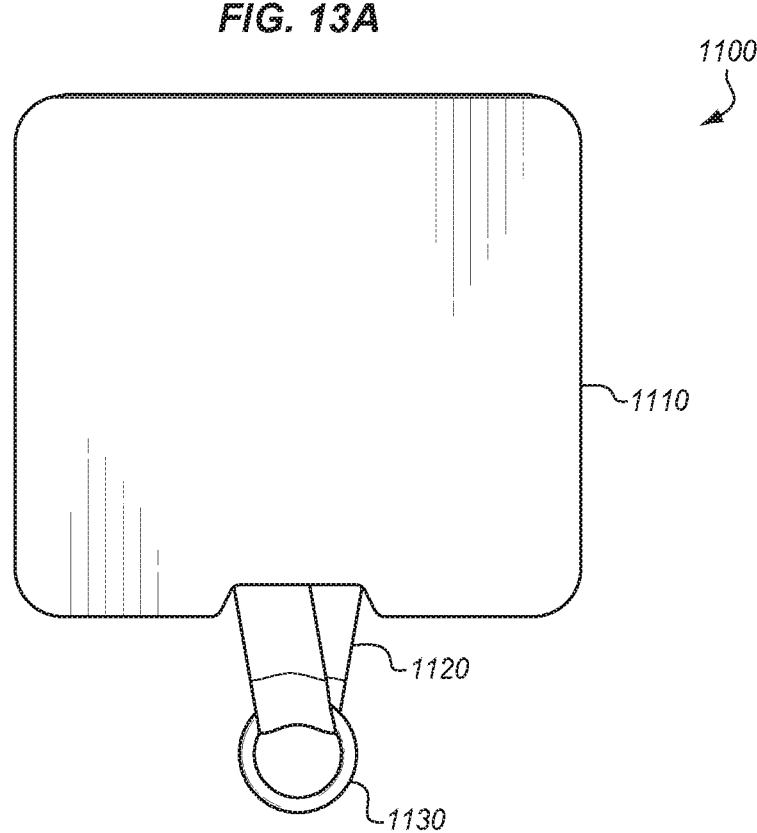
FIG. 13A shows a top view of another embodiment of an attachment device.

FIG. 13A shows a top view of another embodiment of an attachment device. In this embodiment body 1110 is composed of cling vinyl. Also shown are the strengthening material 1120 and a ring 1130. Typically ring 1130 is composed of metal. In this case it is zinc plated steel. The strengthening material is typically composed of nylon, but may be made of any material that has strength and flexibility.

Figure 13B:
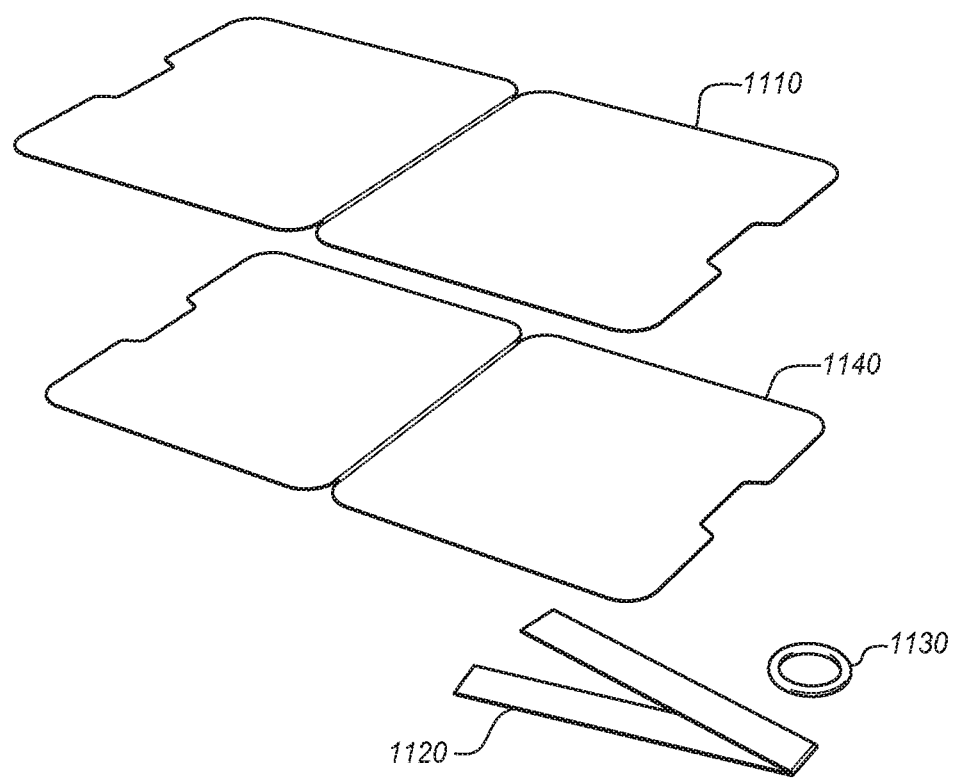
FIG. 13B shows an exploded view of the attachment device of FIG. 13A.

FIG. 13B shows an exploded view of attachment device 1100. Here body 1110 is shown in an unfolded configuration. Strengthening material 1120 is shown in the folded position as it is sandwiched between the folded body 1110. Additionally shown is adhesive tape 1140. Tape 1140 is typically double sided adhesive. This tape 1140 holds the device together. The ends may alternatively be glue together or in some scenarios heat melted together. Additionally visible is cutout 1111. Cutout 1111 relieves pressure on the device as described above.

Figure 14A:
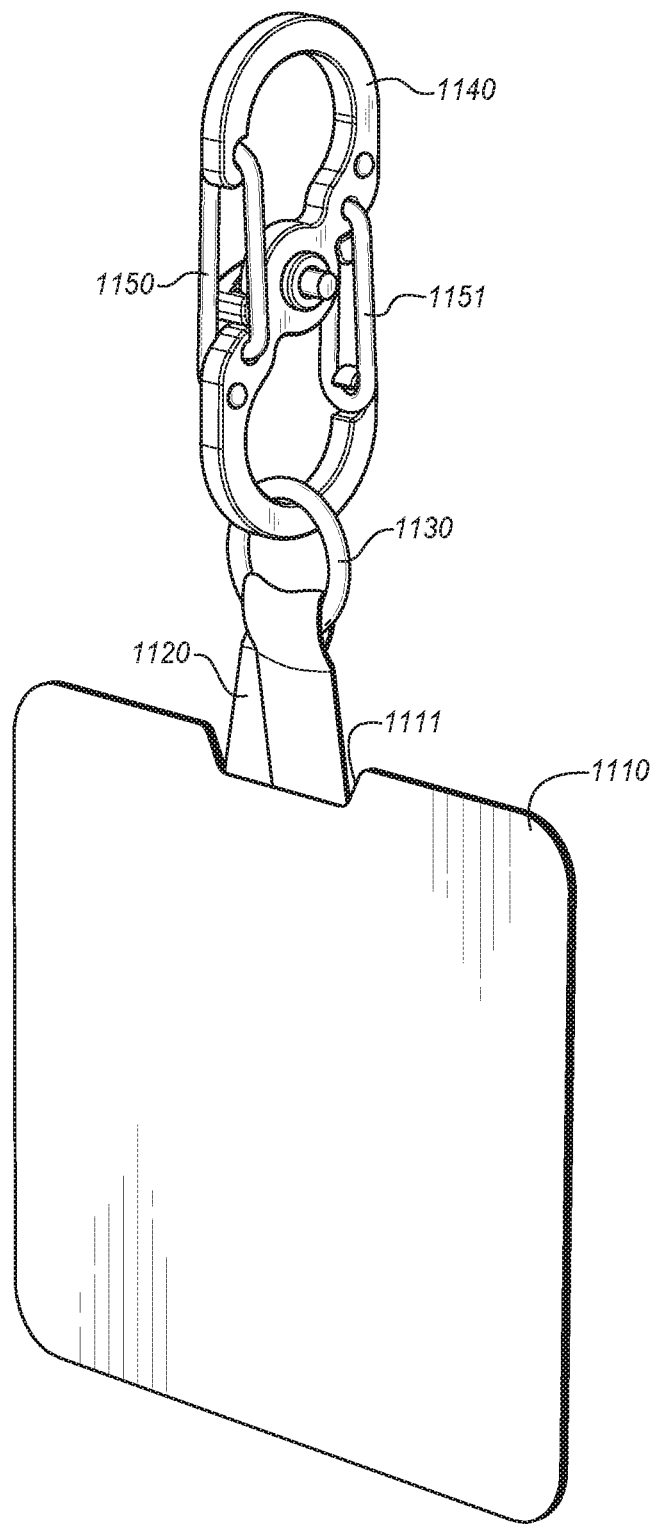
FIG. 14A shows another embodiment of an attachment device that includes a carabiner.

FIG. 14A shows another embodiment of an attachment device 1100 that includes a carabiner 1140. Carabiner 1140 fits on ring 1130. Carabiner 1140 is shown as a locking double carabiner and includes two gates 1150, 1151. This is thought to be advantageous, since one gate may remain closed, gate 1151, while the other gate is opened, gate 1150, to lock the device on an item. Various other carabiners or connection devices may be used in place of carabiner 1140.

Figure 14B:
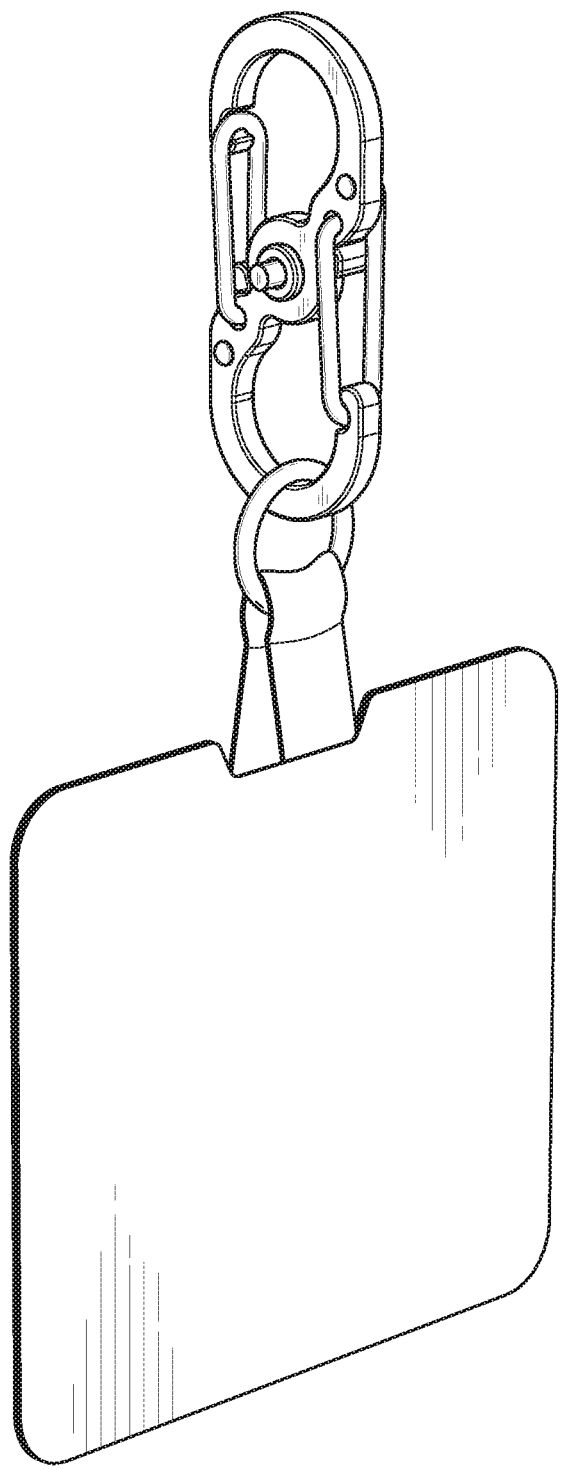
FIG. 14B shows another view of the attachment device of FIG. 14A.
Figure 15:
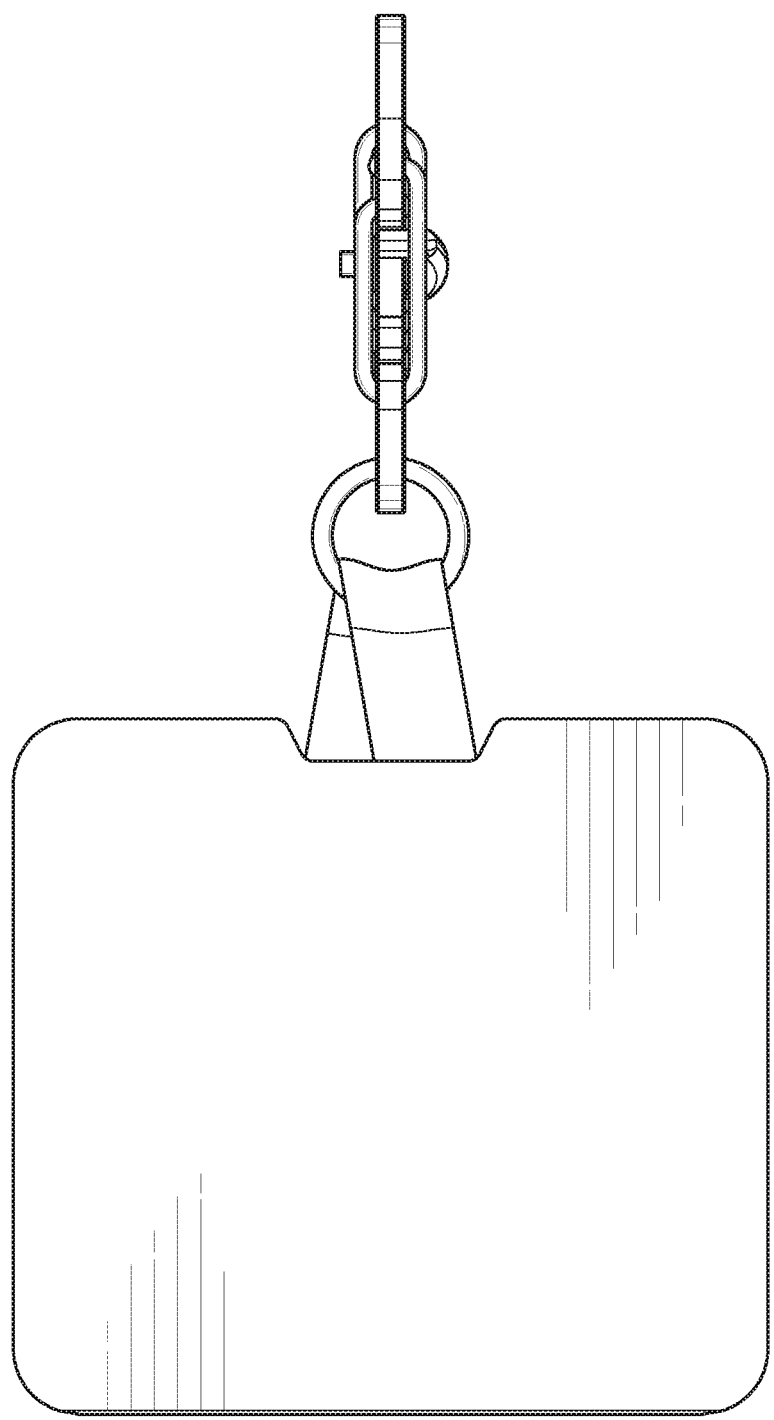
FIG. 15 shows another view of the attachment device of FIG. 14A.
Figure 16:
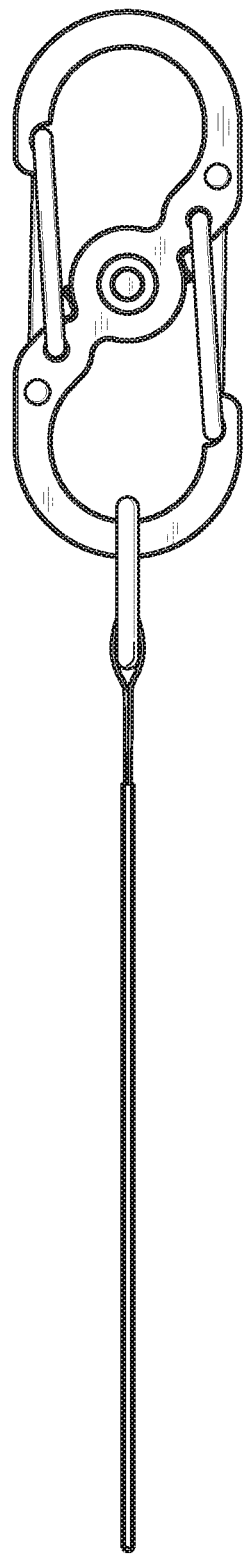
FIG. 16 shows another view of the attachment device of FIG. 14A.
Figure 17:
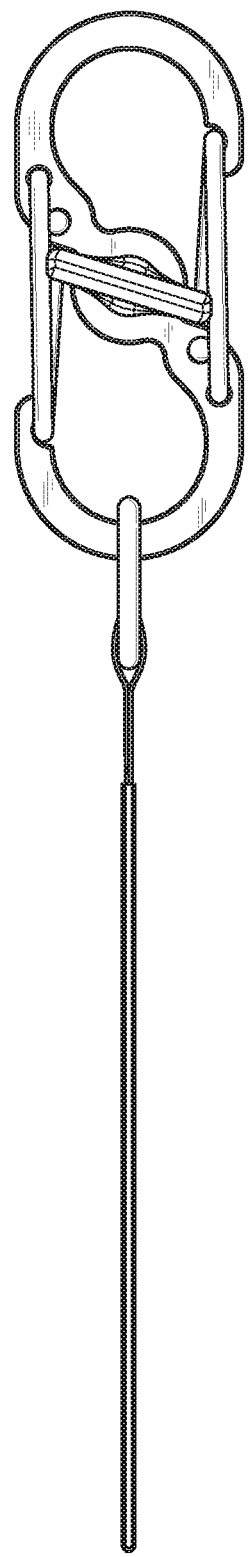
FIG. 17 shows another view of the attachment device of FIG. 14A.

FIG. 14B shows another view of the attachment device 1100 that includes a carabiner 1140. FIG. 15 shows another view of the attachment device 1100 that includes a carabiner 1140. FIG. 16 shows another view of the attachment device 1100 that includes a carabiner 1140. FIG. 17 shows another view of the attachment device 1100 that includes a carabiner 1140.

Figure 18:
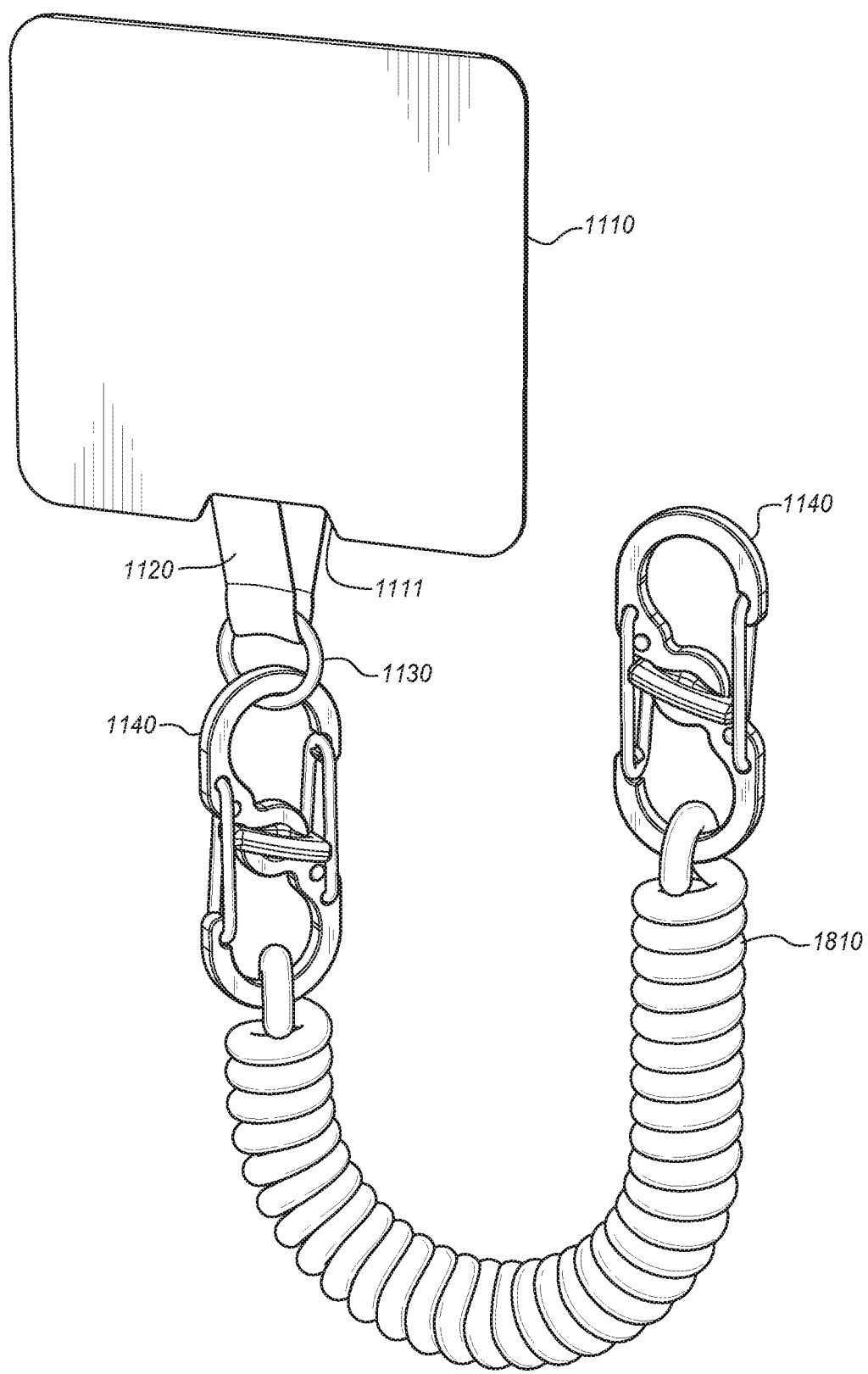
FIG. 18 shows another embodiment of the attachment device that includes a carabiner, a connection lanyard, and another carabiner.
Figure 19:
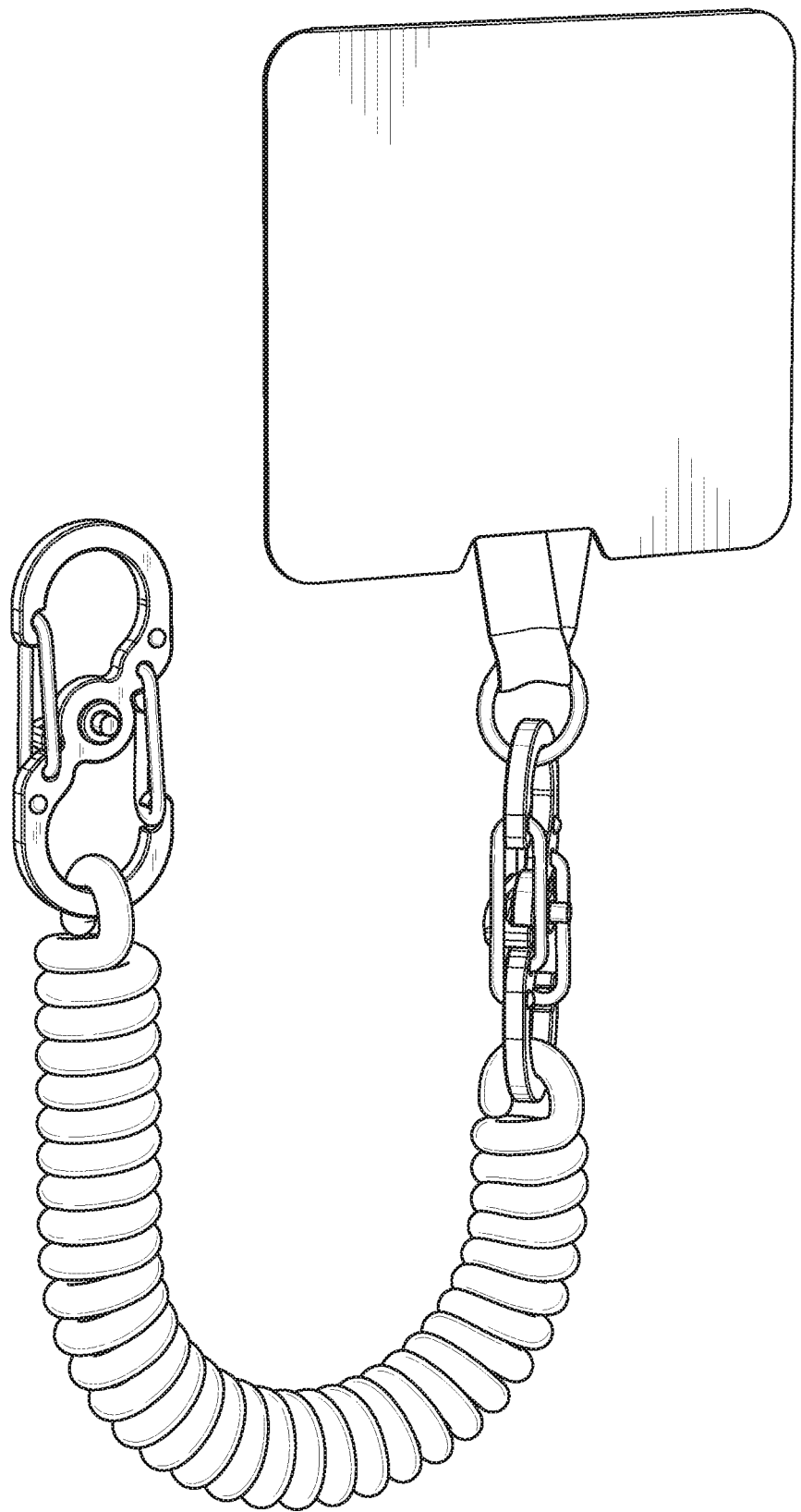
FIG. 19 shows another view of the attachment device of FIG. 18.

FIG. 18 shows another embodiment of the attachment device 1100 that includes a carabiner 1140, a connection lanyard 1810, and another carabiner 1140. In this configuration, the carabiner 1140 near to the connection device 1110 is connected to lanyard 1810 that is connected to the far carabiner 1140. FIG. 19 shows another view of the attachment device 1100 that includes a carabiner 1140, a connection lanyard 1810, and another carabiner 1140. In the embodiment shown, the lanyard is a rubberized spring material that may stretch from a contacted spring position to an extended spring position and visa-versa. Various other lanyards may be used.

While attachment devices (also discussed as removable mobile device connection apparatuses) have been described above in terms of specific embodiments, it is to be understood that the attachment devices are not limited to these disclosed embodiments. Many modifications and other embodiments of the attachment devices will come to mind of those skilled in the art to which this disclosure pertains in light of this disclosure, and which are intended to be and are covered by both this disclosure and the appended claims. It is indeed intended that the scope of the attachment devices should be determined by proper interpretation and construction of the appended claims and their legal equivalents.

The term iPhone® is a registered United State trademark of Apple, Inc. of Cupertino, Calif., USA.

The terms Samsung®, Samsung Galaxy® are registered United States trademarks of Samsung Electronics Co., Ltd., Republic of Korea.

The term Otterbox® is a registered United States trademark of Otter Products, LLC of Fort Collins, Colo., USA.

What is claimed is:

1. A mobile device connection apparatus, comprising:
   a plate-like piece of material, the plate-like piece of material having electrostatic cling properties, the plate-like piece of material folded onto itself;
   a connector, the connector sandwiched between the plate-like piece of material;
   wherein the plate-like piece of material is shaped to fit on a back of an electronic device, such that the plate-like piece of material is sandwiched between the back of the electronic device and a case, the plate-like piece shaped and having the electrostatic cling properties, to resist lateral movement in relation to the electronic device while being held to the back of the electronic device from moving in an orthogonal direction in relation to the electronic device.

2. The mobile device of claim 1, wherein the plate-like piece of material is composed of polyvinyl chloride.

3. The mobile device connection apparatus of claim 2, wherein the connector is a thin ribbon of material.

4. The mobile device connection apparatus of claim 3, wherein the connector is nylon.

5. The mobile device connection apparatus of claim 4, further comprising a ring attached to the connector.

6. The mobile device connection apparatus of claim 5, wherein the plate-like piece of material has a rectangular shape with rounded corners.

7. The mobile device connection apparatus of claim 6, wherein the connector extends from an edge of the plate-like piece of material and a portion of the edge is cut back towards a center of the plate-like piece of material where the connector extends from the edge.

8. The mobile device connection apparatus of claim 7, further comprising an adhesive holding the plate-like piece of material in a folded position.

9. The mobile device connection apparatus of claim 8, wherein the adhesive is an adhesive sheet.

10. The mobile device connection apparatus of claim 9, further comprising a carabiner attached to the ring.

11. The mobile device connection apparatus of claim 10, wherein the carabiner is a double gated carabiner.

12. The mobile device connection apparatus of claim 11, further comprising a lanyard attached to the carabiner.

13. The mobile device connection apparatus of claim 12, further comprising a carabiner attached to the lanyard.

14. The mobile device connection apparatus of claim 7, wherein the connector is positioned in the plate-like piece of material, such that the connector extends out of the case near a charging port of the electronic device.

15. The mobile device connection apparatus of claim 14, wherein the connector extends out of an aperture of the case positioned for the charging port.

16. A mobile device connection apparatus for holding a mobile device, comprising:
    a flat body piece;
    a connector attached to the flat body piece; and
    a case, the case sandwiching the flat body piece between the case and a back of the mobile device,
    wherein the flat body piece is folded on itself to sandwich the connector, such that only a portion of the connector extends out.

17. The mobile device connection apparatus of claim 16, wherein the flat body piece strongly resists lateral movement in relation to a plane of the back of mobile device when on the back of the mobile device.

18. The mobile device connection apparatus of claim 17, wherein the flat body piece resists orthogonal movement in relation to the plane of the back of the mobile device less than the lateral movement.

19. The mobile device connection apparatus of claim 18, wherein the case prevents the orthogonal movement.

20. The mobile device connection apparatus of claim 16, wherein the flat body piece is composed of a material that strongly resists lateral movement in relation to a plane of the back of mobile device when on the back of the mobile device.

21. The mobile device connection apparatus of claim 20, wherein the flat body piece is composed of the material that resists orthogonal movement in relation to the plane of the back of the mobile device less than the lateral movement.

22. The mobile device connection apparatus of claim 21, wherein the case prevents the orthogonal movement.

23. The mobile device connection apparatus of claim 22, wherein the material has electrostatic cling properties.

24. The mobile device connection apparatus of claim 23, wherein the material is polyvinyl chloride.

25. The mobile device connection apparatus of claim 24, wherein the connector extends from an edge of the flat body piece, in line with a largest plane of the flat body piece.

26. The mobile device connection apparatus of claim 25, wherein the edge is cut back where the connector extends from the edge.

27. The mobile device connection apparatus of claim 16, wherein the connector is a thin ribbon of material.

28. The mobile device connection apparatus of claim 27, wherein the connector is nylon.

29. The mobile device connection apparatus of claim 28, further comprising a ring attached to the connector.

30. The mobile device connection apparatus of claim 29, further comprising a carabiner attached to the ring.

31. The mobile device connection apparatus of claim 30, wherein the carabiner is a double gated carabiner.

32. The mobile device connection apparatus of claim 31, further comprising a lanyard attached to the carabiner.

33. The mobile device connection apparatus of claim 32, further comprising a carabiner attached to the lanyard.

34. The mobile device connection apparatus of claim 16, wherein the flat body piece has a rectangular shape with rounded corners.

35. The mobile device connection apparatus of claim 16, wherein the connector is positioned in the flat body piece, such that the connector extends out of the case near a charging port of the electronic device.

36. The mobile device connection apparatus of claim 35, wherein the connector extends out of an aperture of the case positioned for the charging port.

37. The mobile device connection apparatus of claim 16, further comprising an adhesive sheet positioned in a fold of the flat body piece to hold the flat body piece in a folded position.

* * * * *